United States Patent [19]

Spicka et al.

[11] 4,174,854
[45] Nov. 20, 1979

[54] BUILDING AND CONSTRUCTIONAL MACHINES OR VEHICLES

[75] Inventors: Roland Spicka, Serrig; Adolf Krob, Konz; Detlev Seidel, Konz; Paul Viefhaus, Konz, all of Fed. Rep. of Germany

[73] Assignee: Zettelmeyer Maschinenfabrick GmbH & Co. KG Konz, Fed. Rep. of Germany

[21] Appl. No.: 883,680

[22] Filed: Mar. 6, 1978

[30] Foreign Application Priority Data

Mar. 9, 1977 [DE] Fed. Rep. of Germany ....... 2710239

[51] Int. Cl.² ............................................ B62D 61/12
[52] U.S. Cl. .................................. 280/702; 280/708; 280/709; 280/711; 280/754

[58] Field of Search ............. 280/754, 688, 708, 690, 280/698, 699, 700, 701, 702–714, 718, 724, 725, 6 H, 6.1; 267/18, 20; 180/611, 24.02

[56] References Cited

U.S. PATENT DOCUMENTS

| 2,020,489 | 11/1935 | Walker | 280/754 |
| 3,771,812 | 11/1973 | Pierce | 180/24.02 |
| 3,883,153 | 5/1975 | Singh | 280/754 |
| 4,065,143 | 12/1977 | Iida | 280/708 |

Primary Examiner—Robert R. Song
Attorney, Agent, or Firm—Lawrence R. Radanovic

[57] ABSTRACT

The running gear of a construction vehicle or the like is provided with a resilient suspension adapted to be effective in transport operations and ineffective in working operations.

9 Claims, 3 Drawing Figures

BUILDING AND CONSTRUCTIONAL MACHINES OR VEHICLES

BACKGROUND OF THE INVENTION

1. Field to which the Invention Relates

The invention relates to wheeled building and construction vehicles such as wheel or shovel loaders, wheel dozers, front loaders, overhead loaders, graders and the like. In this respect it more particularly is a question of building and constructional machines with pneumatic tires.

2. The Prior Art

Building and construction vehicles equipped with pneumatic tires are not normally provided with resilient suspension systems. The only cushioning means has been provided in the form of low pressure pneumatic tires. However such a cushioning effect only leads to a very small or practically negligible resilient relative displacement. In order to compensate at least to some extent for the unevenness of the ground on which construction vehicles are driven and to keep the wheels in proper engagement with the ground, four-wheel vehicles with articulated axles have been provided. Vehicles with a two-part steerable articulated chassis with the joints between the two chassis parts adapted to perform a swinging movement in a vertical plane, have also been provided.

Owing to the shortcomings of the cushioning means the speed of travel of such vehicles were confined to comparatively low limits. On uneven terrain and in the case of the use for example of wheel bearings it was hardly possible to reach speeds above 15-20 km/h. Besides this low speed limit the vehicles were uncomfortable to drive, since the jolts due to unevenness of the ground were only compensated for to a very incomplete extent by the low pressure pneumatic tires and the drivers of such vehicles were subjected to the resulting physical stresses. Owing to the comparatively low top speed of travel such construction vehicles cannot be transferred on a highway or other high-speed road to their sites of use or, if they were in fact transferred over prolonged distances substantial expenses arose. In both cases suitable low-loaders were required for transporting such vehicles.

SHORT SUMMARY OF THE INVENTION

An object of the present invention is to avoid these disadvantages by providing a resilient suspension system for vehicles equipped with pneumatic tires.

In carrying out this objective according to the invention, the running gear of the construction machine or vehicle is provided with a resilient suspension system which is effective during travel but during operation of the machine for its intended purpose is made ineffective. Such resilient suspension system is of a hydraulic or hydropneumatic type, which by actuating a switch over device can be made pressureless or placed under pressure at will. In accordance with one particular form of the invention the vehicle parts or chassis, which are resiliently suspended during travel, can be locked with the running gear parts such as wheel axles, axle holders or the like supporting them. In this respect, in accordance with a particularly advantageous principle of the invention, the locking device is automatically brought into the locked condition at the time the resilient suspension system is made inoperative or when a hydropneumatic resilient suspension system is deprived of pressure, and on switching on the resilient suspension system or putting the system under pressure, the system is unlocked. When pivoting levers, as for example triangular pivoting levers, are used for holding the wheel axles, the levers are, in accordance with the invention, supported by spring cylinders and for the operating condition of the machine they can be locked with the vehicles parts, which are otherwise sprung, or chassis parts. This locking can in accordance with the invention be effected for the hydraulic or hydropneumatic system by the use of a locking cylinder. Further features of the invention are set forth in the appended claims and in the following description with reference to the drawings.

The invention makes it possible for construction or building machines or vehicles to be designed for higher top speeds of, for example, above 60-80 km/h. Such vehicles can accordingly be transported more economically "under their own steam" on highways or other high-speed roads. Despite the higher top speeds hereby made possible, such vehicles are substantially more comfortable for the driver both when travelling and also when being operated. This high degree of driver comfort means that the driver is less stressed and will therefore be more dependable and efficient at work. Furthermore owing to the substantially improved resilient suspension of such heavy duty and super heavy duty construction machines or vehicles, there will be less damage to the roads used. Owing to the resilient suspension in accordance with the invention, which can be made inoperative during use of the machines for their intended purpose, it is not necessary to provide a complex construction using an articulated axle, because in a simple manner one of the two vehicle axles can be so connected with the spring struts that the spring struts themselves enable an articulated axle effect to be achieved.

BRIEF DESCRIPTION OF THE DRAWINGS

In the accompanying drawings the invention is shown in one form of embodiment by way of example.

DESCRIPTION OF PREFERRED EMBODIMENT

Figure 1:
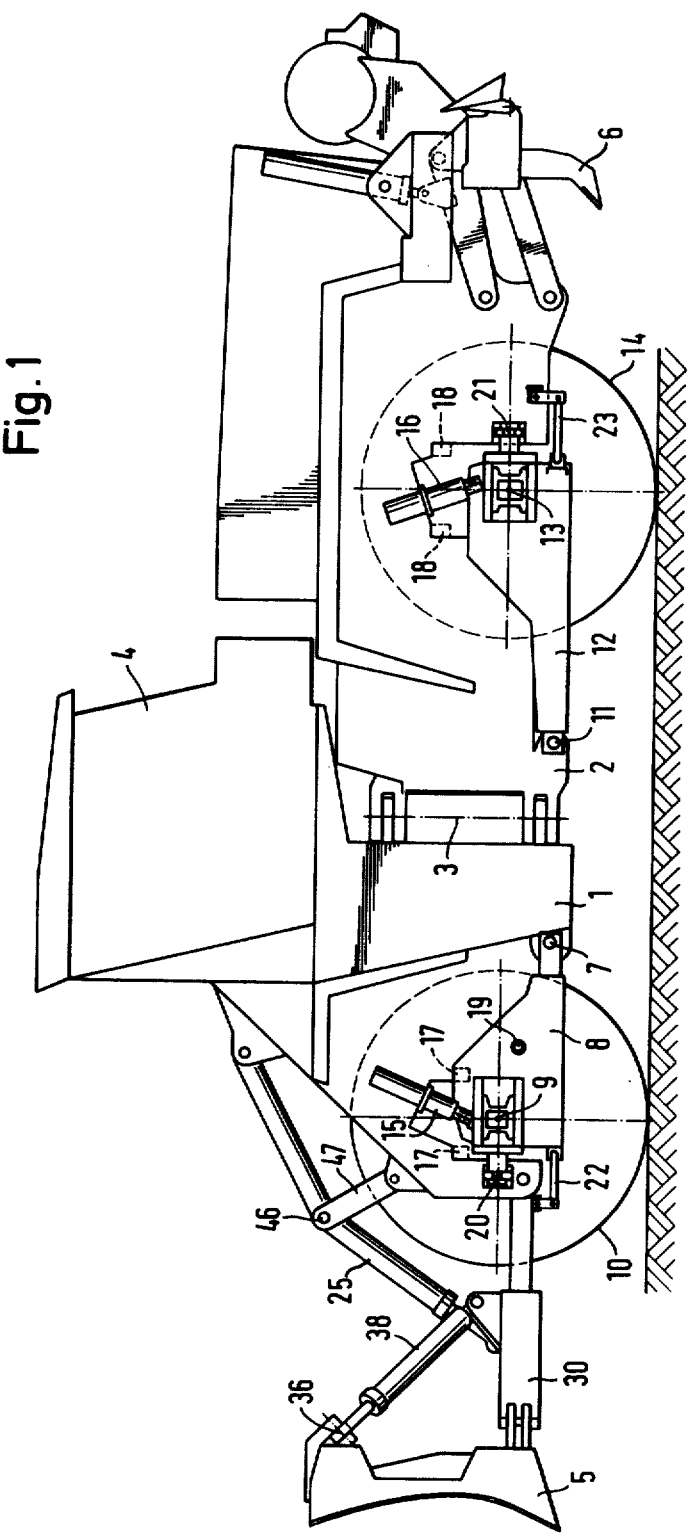
FIG. 1 is a diagrammatic side elevational view of a wheel dozer incorporating the invention and adapted for road transport between sites.

A dozer of the wheeled type comprises a front carriage 1 and a rear carriage 2, which are pivotally connected together by a vertical joint pin 3. The front carriage 1, on which the driver's cabin 4 is arranged, carries a hydraulically actuated blade 5 (or a shovel or the like) while on the rear carriage 2 a ripper 6 is attached which can also be hydraulically operated for raising and lowering.

On the front carriage 1 there is a triangular pivoting lever 8 adapted to rotate about a horizontal axis 7. A front axle 9 of front vehicle wheels 10 is journalled in the pivoting lever 8. On the rear carriage 2 there is in a corresponding manner a triangular pivoting lever 12 adapted to pivot about a horizontal pin 11. A rear axle 13 of rear vehicle wheel 14 is journalled in the lever 12. The triangular pivoting levers 8 and 12 hold the front axle 9 and the rear axle 13 respectively in the longitudinal direction and transmit the braking and thrust forces. When the resilient suspension system is operative they serve for transfer of the swinging movements of the axles 9 and 13 respectively.

The front triangular pivoting lever 8 is supported by two front spring cylinders 15, while the rear triangular pivoting lever can be correspondingly supported by two rear spring cylinders 16. The spring cylinders 15 and 16 are tangentially matched to suit the swing axes of the vehicle axles 9 and 13 and take up the masses to be resiliently suspended. For limiting the resilient displacements in the resiliently suspended condition of the vehicle to the front and the rear four respective abutments 17 and respectively 18 are provided.

Before the beginning of dozing or shovelling work the front carriage or the front running gear part 1 is locked to the front triangular pivoting lever 8 by means of a locking cylinder 19 so that these parts form a rigid unit. The rear triangular pivoting lever 12 can then come to rest against the abutments and swing underneath them.

The front and rear transverse links 20 and 21 serve for proper guidance of the axles and take up lateral thrust forces. In order to reduce the tendency of the vehicle to move sideways to a minimum permissible amount on the front and rear axles transverse stabilizers 22 and 23 are arranged.

Figure 3:
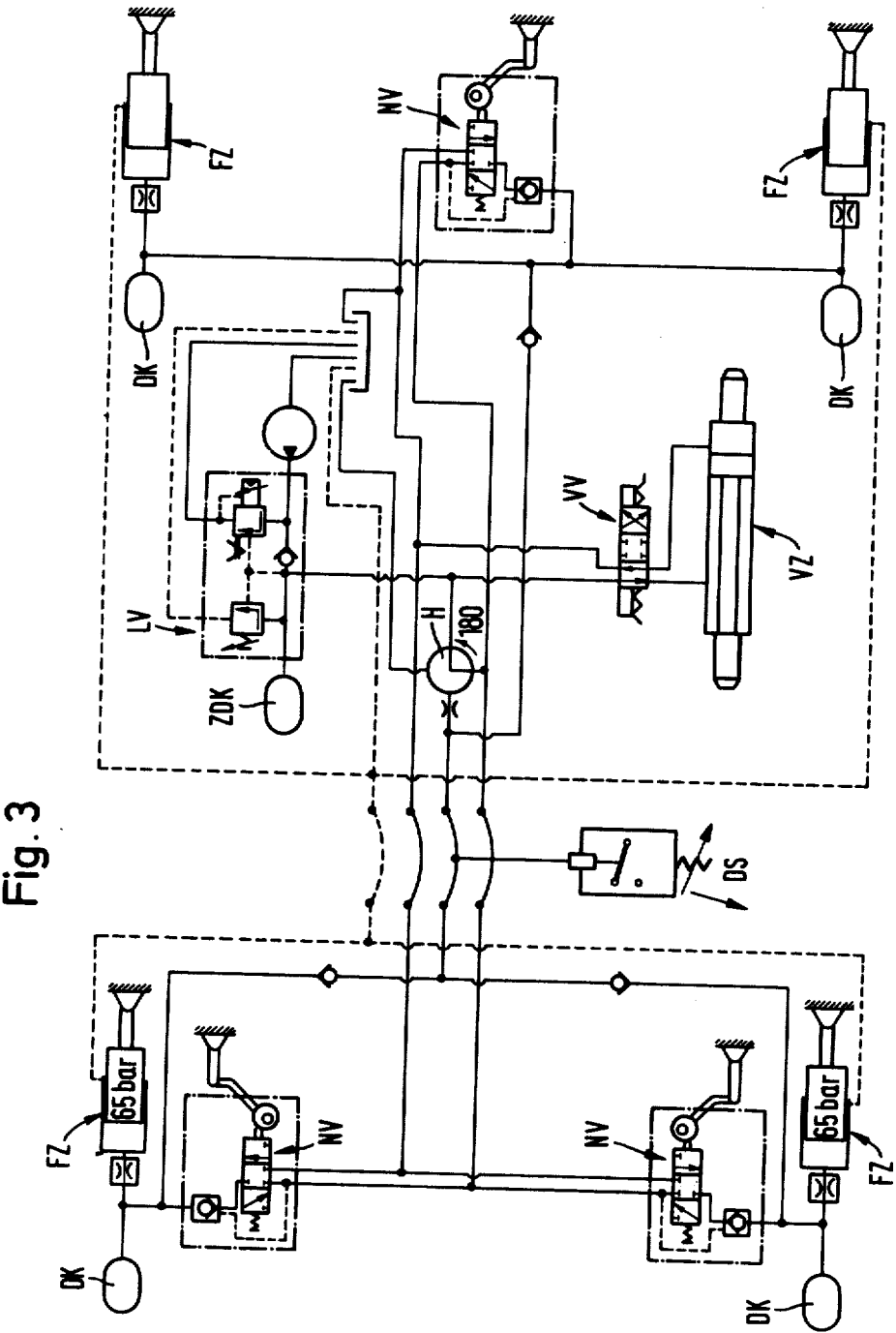
FIG. 3 is a schematic operation diagram of a hydropneumatic resilient suspension system having locking means in accordance with the invention.

The function of the hydropneumatic resilient suspension system and the locking means is indicated diagrammatically in FIG. 3 showing an operating diagram.

The spring cylinders and the locking cylinders are supplied with oil from a central pressure source. The level regulation valves NV control the supply and removal of the oil under pressure in the spring elements and accordingly regulate the level position of the vehicle automatically. A gear-wheel pump draws oil from the oil container and pumps it into a central pressure accumulator ZDK via an accumulator loading valve LV. The accumulator loading valve switches the pump over to free idling movement when it has reached a preset high pressure. If the oil in the central pressure accumulator ZDK decreases owing to the removal of oil, on achieving a lower switching on point the pump is again made operative for charging or loading the accumulator and the central pressure accumulator ZDK is replenished.

The resilient suspending action is brought about via the spring cylinders FZ (denoted by 15 and 16 in FIG. 1) on the front axle and the rear axle. The oil displaced by the spring cylinders FZ on resilient movements is forced into the spring pressure accumulator DK on the front axle and the rear axle and flows back into the spring cylinders FZ when the resilient suspension system is allowed to relax.

Figure 2:
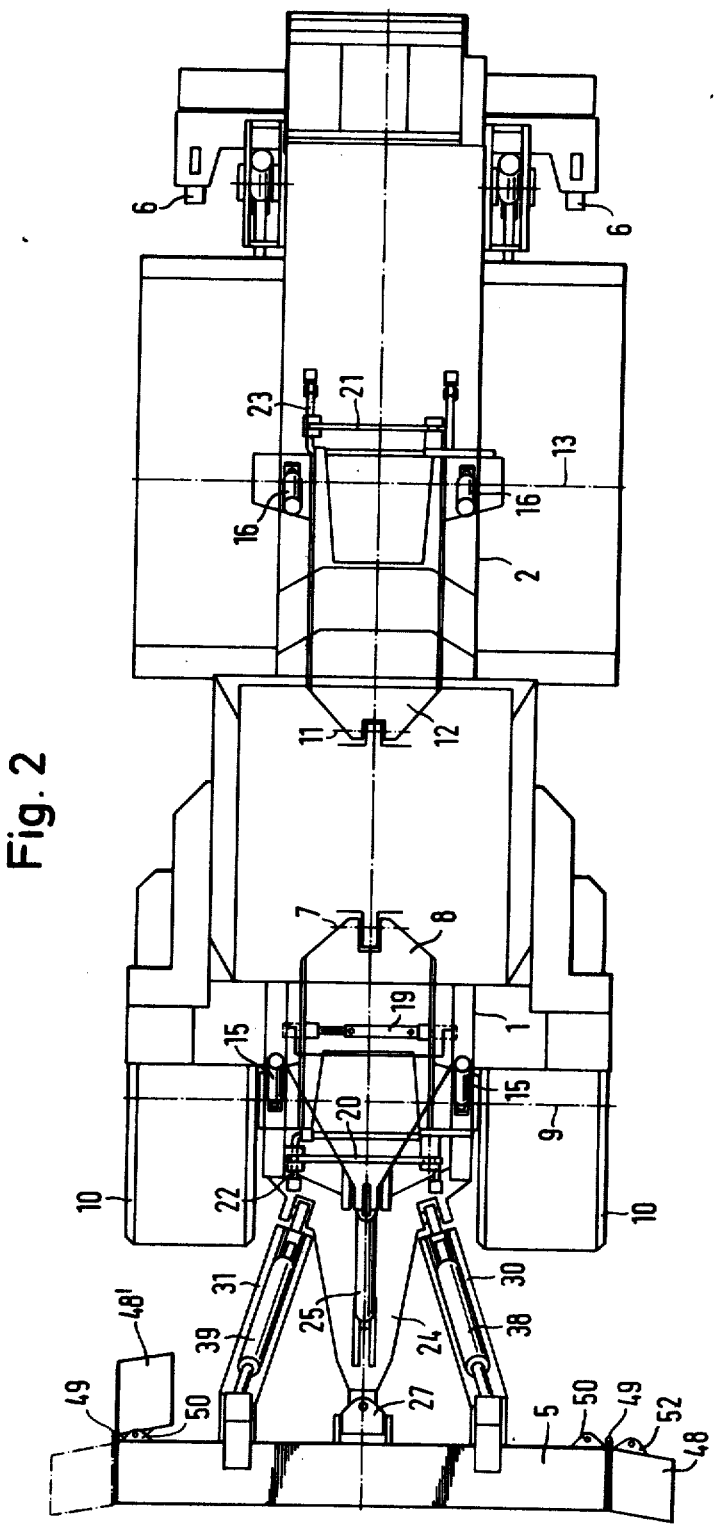
FIG. 2 is a top plan view of the dozer of FIG. 1.

For smooth running and in order to deaden swinging movements damping elements are provided respectively at the spring cylinder outputs between the spring cylinder FZ and the pressure accumulator DK. The machine has three level regulating valves NV, which are supplied with oil under pressure from the central pressure accumulator. The purpose of the level regulating valves NV is to keep the machine at a constant level irrespective of loading when the resilient suspension system is operative. Since for rapid travel on a road soft suspension of the machine is required while on the other hand for working the machine should be rigid in this respect, the resilient suspension may be made inoperative. Before starting work with the dozing blade or the shovel it is necessary to lower the machine and lock it. This is carried out by switching over a cock H. The cock H cuts off the pressure supply to the level regulating valves NV and empties the spring cylinders FZ. As soon as the system is pressureless, a pressure switch DS switches over a locking valve VV to "locked". The locking cylinder VZ, denoted by reference 19 in FIGS. 1 and 2 then connects the front axle rigidly with the chassis. This ensures satisfactory ground contact of the vehicle in the working condition.

Before putting the resilient suspension system into operation again the front axle must be unlocked. By switching over the cock H the resilient suspension system is put into operation. As soon as the system has a pressure for example of 10 bar, the pressure switch DS is operated and passes a signal to the locking valve VV so that the locking cylinder VZ is unlocked.

The invention is of course not limited to the embodiment described above and represented in the accompanying drawings but likewise includes all modifications within the scope of the significant features of the invention. For example the invention could be applied to a shovel loader or an other travelling construction machines. Furthermore locking by means of a locking cylinder could also be provided for the rear carriage 2 with the triangular pivoting lever 12.

We claim:

1. A construction vehicle, comprising running gear means, wheel axles mounted on said gear means and wheels mounted on said axles, a resilient suspension system on said running gear means for cushioning the vehicle during transport, means for pressurizing and depressurizing said system for respectively resiliently cushioning said running gear during vehicle transport and for rigidifying said running gear during a working operation, and means for locking at least one of said axles against cushioning during said working operation.

2. The vehicle according to claim 1, wherein said locking means includes means for carrying out an automatic locking operation upon inoperation of said suspension system as when said system is depressurized, and for carrying out an automatic unlocking operation upon operation of said suspension system as when said system is pressurized.

3. The vehicle according to claim 1, wherein said running gear means include a frame and front and rear levers mounted on said frame for pivotal movement about horizontal axes, said suspension system including spring cylinder units.

4. The vehicle according to claim 3, wherein said locking means are disposed for locking at least one of said levers to said frame.

5. The vehicle according to claim 3, wherein said locking means include at least one locking cylinder unit.

6. The vehicle according to claim 5, wherein said locking cylinder unit is mounted on one of said levers and is movable into and out of engagement with said frame.

7. The vehicle according to claim 3, wherein said frame has abutment means thereon for limiting the pivotal movement of said levers.

8. The vehicle according to claim 3, wherein transverse links are provided on said levers adjacent said wheel axles.

9. The vehicle according to claim 3, wherein transverse stabilizers are provided on said levers adjacent said wheel axles.

* * * * *